US010542108B2

(12) United States Patent
Gibson et al.

(10) Patent No.: US 10,542,108 B2
(45) Date of Patent: Jan. 21, 2020

(54) DATA TRANSFER IN A FEDERATED PUBLISH/SUBSCRIBE SYSTEM

(71) Applicant: International Business Machines Corporation, Armonk, NY (US)

(72) Inventors: Christopher R. Gibson, Hampshire (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/912,624

(22) PCT Filed: Aug. 6, 2014

(86) PCT No.: PCT/EP2014/066881
§ 371 (c)(1),
(2) Date: Feb. 18, 2016

(87) PCT Pub. No.: WO2015/062758
PCT Pub. Date: May 7, 2015

(65) Prior Publication Data
US 2016/0234329 A1   Aug. 11, 2016

(30) Foreign Application Priority Data

Oct. 28, 2013   (GB) .................................. 1318964.2

(51) Int. Cl.
*H04L 29/08* (2006.01)
*G06F 9/54* (2006.01)

(52) U.S. Cl.
CPC .......... *H04L 67/2809* (2013.01); *H04L 67/26* (2013.01); *H04L 67/2828* (2013.01); *G06F 9/542* (2013.01)

(58) Field of Classification Search
CPC ...... H04L 67/26; H04L 67/2809; G06F 9/542
See application file for complete search history.

(56) References Cited

U.S. PATENT DOCUMENTS 6,643,682 B1 * 11/2003 Todd .................. G06F 16/9535
709/202
7,103,680 B1 * 9/2006 Holdsworth ............ G06F 9/542
709/246

(Continued)

FOREIGN PATENT DOCUMENTS

GB          2469695          10/2010

*Primary Examiner* — Jeong S Park
(74) *Attorney, Agent, or Firm* — Schmeiser, Olsen & Watts, LLP; Mark Vallone

(57) ABSTRACT

A method and federated publish/subscribe system for data transfer in the federated publish/subscribe system. The federated publish/subscribe system includes a processor, a first message broker, and a second message broker. The second message broker transmits, via the processor, a message A to a first subscribing application and a message (A+Δ) to a second subscribing application. The message (A+Δ) differs from the message A by changes Δ. The first subscribing application and the second subscribing application are different subscribing applications. Prior to the transmitting by the second message broker, the second message broker receives, from the first message broker via the processor, either (i) a message (A, Δ) comprising the message A and the changes Δ or (ii) the message A and a message Δ comprising the changes Δ.

18 Claims, 7 Drawing Sheets

(56) References Cited

U.S. PATENT DOCUMENTS

| | | | |
|---|---|---|---|
| 9,009,351 B2 * | 4/2015 | Lavoie | G06Q 40/04 705/37 |
| 2005/0188039 A1 * | 8/2005 | Charters | H04L 51/063 709/206 |
| 2006/0209868 A1 * | 9/2006 | Callaghan | G06Q 10/00 370/428 |
| 2007/0043824 A1 | 2/2007 | Fremantle | |
| 2008/0133337 A1 * | 6/2008 | Fletcher | G06F 16/958 705/7.11 |
| 2011/0016221 A1 * | 1/2011 | Amicangioli | G06Q 40/04 709/230 |
| 2012/0215859 A1 | 8/2012 | Bhogal et al. | |
| 2012/0246219 A1 | 9/2012 | Bhogal et al. | |
| 2012/0311067 A1 | 12/2012 | Fremantle | |

* cited by examiner

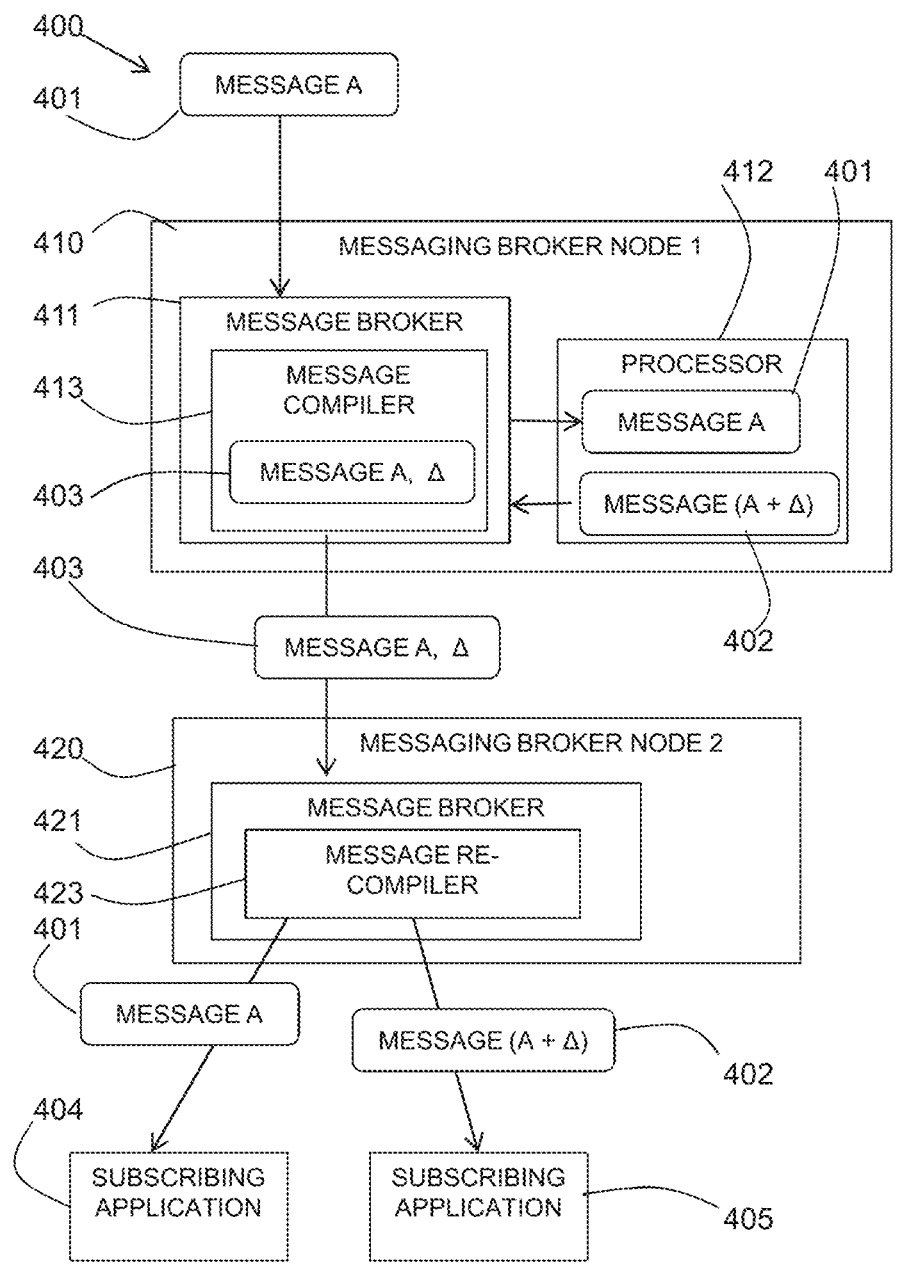

DATA TRANSFER IN A FEDERATED PUBLISH/SUBSCRIBE SYSTEM

FIELD OF INVENTION

This invention relates to the field of federated publish/subscribe message brokers. In particular, the invention relates to efficient data transfer in federated publish/subscribe message brokers where in flight message processing takes place.

BACKGROUND OF INVENTION

There are technologies available that provide federation across publish/subscribe message brokers. Typically they extend the hub and spoke model used for communicating via a message broker to provide other models for communication such as a bus or mesh. A network of connections is established between brokers along which publish/subscribe information and messages are sent. The result is an extension of publish/subscribe messaging that allows the client to subscribe to sources from a remote broker to which they do not have a direct connection. An example implementation of federated publish/subscribe message brokers is the Fabric for Sensor Network Management and Data Transfer (The Fabric) of International Business Machines Corporation.

Data efficiency is important for these types of federation technologies. As such the amount of data (in terms of both the number of packets and the number of bytes) sent is a high focus area in order to make them as efficient as possible. One of the primary goals of the original design of The Fabric is usage on small devices at the edge of the network. In this scenario data efficiency is a primary concern as the networks available for interconnection of devices can be very slow, expensive and unreliable e.g. radio networks. The available bandwidth must be utilised as efficiently as possible.

The federation technology linking brokers together will typically only send one message between two brokers even if there are many subscribers to the topic on which the message is being sent. This is an efficiency saving for network usage that means multiple copies of the same message are not sent between brokers when many subscribers are present.

Current technologies are intelligent enough to inspect the data and take account of in-flight message processing such that additional copies of the message are only sent on to other brokers in the scenario where the message has been processed and an update to the message has resulted. In this scenario the original message and a new copy of that message including the updated information would be passed between federated brokers (assuming clients are subscribed to both messages).

Therefore, there is a need in the art to address the aforementioned problems.

BRIEF SUMMARY OF THE INVENTION

According to a first a first aspect of the present invention there is provided a method for data transfer in a federated publish/subscribe system, comprising: a first message broker: receiving a message and carrying out in-flight processing of the message to result in an original message and one or more processed messages; compiling a whole message and one or more delta data sets of the changes made by the processing: a second message broker receiving the whole message and the one or more delta data sets and re-constructing the original message and the one or more processed messages.

In one embodiment, the step of compiling a whole message and one or more delta data sets may be carried out by compiling a single message with the whole message and the one or more delta data sets augmented in the message.

In another embodiment, the step of compiling a whole message and one or more delta data sets may be carried out by compiling two or more messages; a first message comprising the whole message, and a second message comprising one or more delta data sets.

The whole message may be the original message or a processed message.

The original message and the one or more processed messages may be published to different subscribing applications.

The whole message and the one or more delta data sets may be sent simultaneously.

The original message and the one or more delta data sets may include identifiers to associate the one or more delta data sets with the original message to which they relate.

According to a second aspect of the present invention there is provided a system for data transfer in a federated publish/subscribe system, comprising: a first message broker including: a message receiver for receiving a message; a processor for carrying out in-flight processing of the message to result in an original message and one or more processed messages; a message compiler for compiling a whole message and one or more delta data sets of the changes made by the processing; a second message broker including: a message receiver for receiving the whole message and the one or more delta data sets: and a message re-compiler for re-constructing the original message and the one or more processed messages.

In one embodiment, the message compiler for compiling a whole message and one or more delta data sets of the changes made by the processing may compile a single message with the whole message and the one or more delta data sets augmented in the message.

In another embodiment, the message compiler for compiling a whole message and one or more delta data sets of the changes made by the processing may compile two or more messages, a first message comprising the whole message, and a second message comprising one or more delta data sets.

According to a third aspect of the present invention there is provided a computer program product for data transfer in a federated publish/subscribe system, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of reducing the volume of network traffic in a publish/subscribe broker network.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIGS. 4A and 4B are block diagrams showing two embodiments of flows of message in accordance with the present invention.

DETAILED DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system provide efficient data transfer in a publish/subscribe architecture in which multiple brokers are joined together to form a network of brokers. This is referred to herein as a federated broker network. A message broker in the broker network may carry out in-flight processing on a message. The described method carried out at a message broker performing in-flight message processing may send an original copy of a message to a next message broker and only the differences or delta between that original message and an in-flight processed version of that message.

Figure 1:
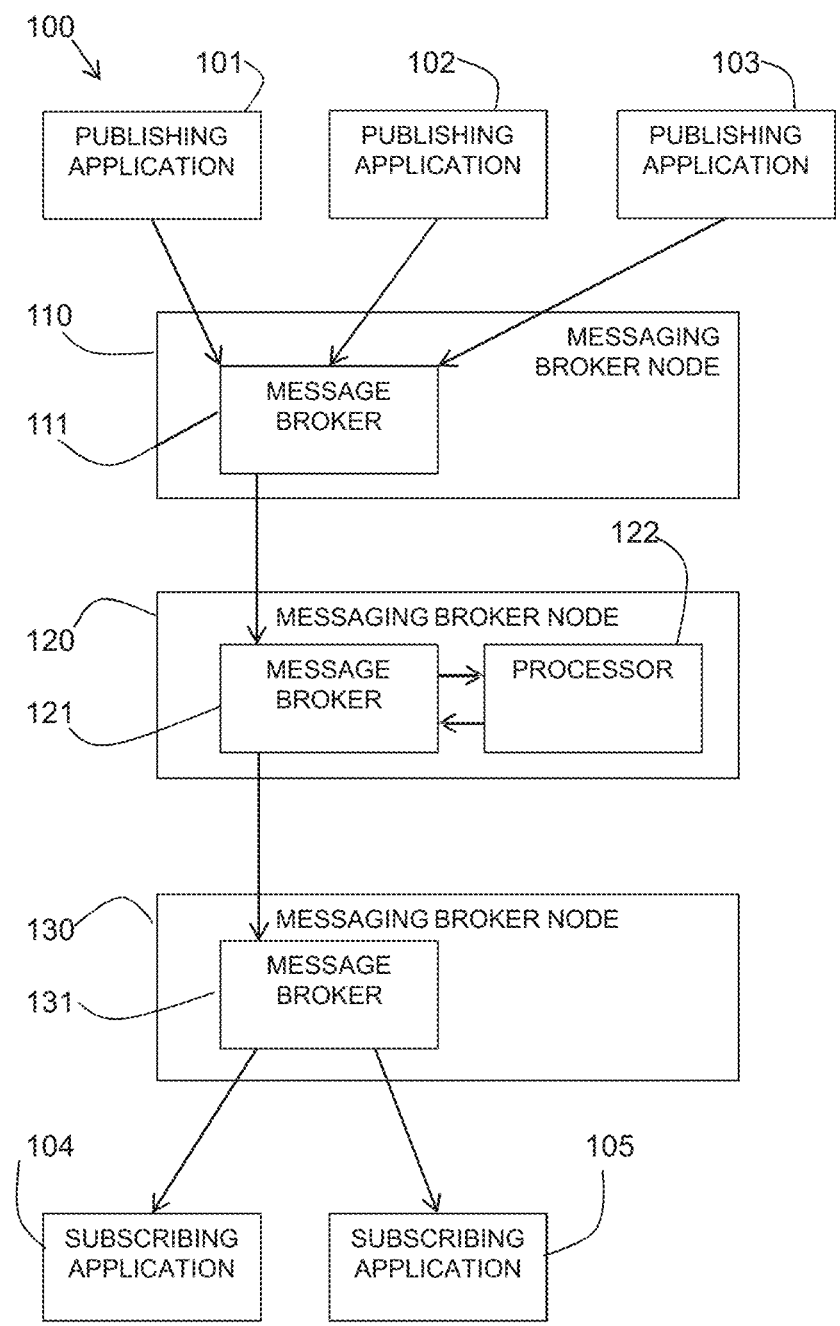
FIG. 1 is block diagram of an example embodiment of a system in accordance with the present invention.

Referring to FIG. 1, a block diagram shows an example embodiment of a federated publish/subscribe messaging broker network 100 in which the described method and system may be implemented.

The example network 100 shows three message broker nodes 110, 120, 130. Messages may be published by publishing applications 101-103 and transmitted through the message broker network 100 to subscribing applications 104, 105.

In this example, a message may be published by a publishing application 101 to a first messaging broker node 110 having a broker 111 which may pass it to a second messaging broker node 120. The second messaging broker node 120 may include a broker 121 which may receive the message and forward it to a third message broker node 130. The third message broker node 130 may have a broker 131 which passes the message on to subscribing applications 104, 105.

One or more of the message broker nodes 110, 120, 130 may include a processor 122 for in-flight processing of messages. A processor 122 is shown in the second message broker node 120 in this example embodiment.

In the described method and system, the broker 121 of the second message broker node 120 may forward to the third message broker node 130 an original message and deltas relating to the difference between a processed message and the original message. In one embodiment, this may be by sending the original message and a separate message containing the delta. In another embodiment, this may be by sending the original message augmented to contain the original content plus the delta. If the in-flight processing results in more than one processed message, more than one delta to be applied to the original message may be sent. This allows for the original message to be delivered (if required) and as many different copies of the original containing different modifications to be delivered to subscribing clients.

Figure 2:
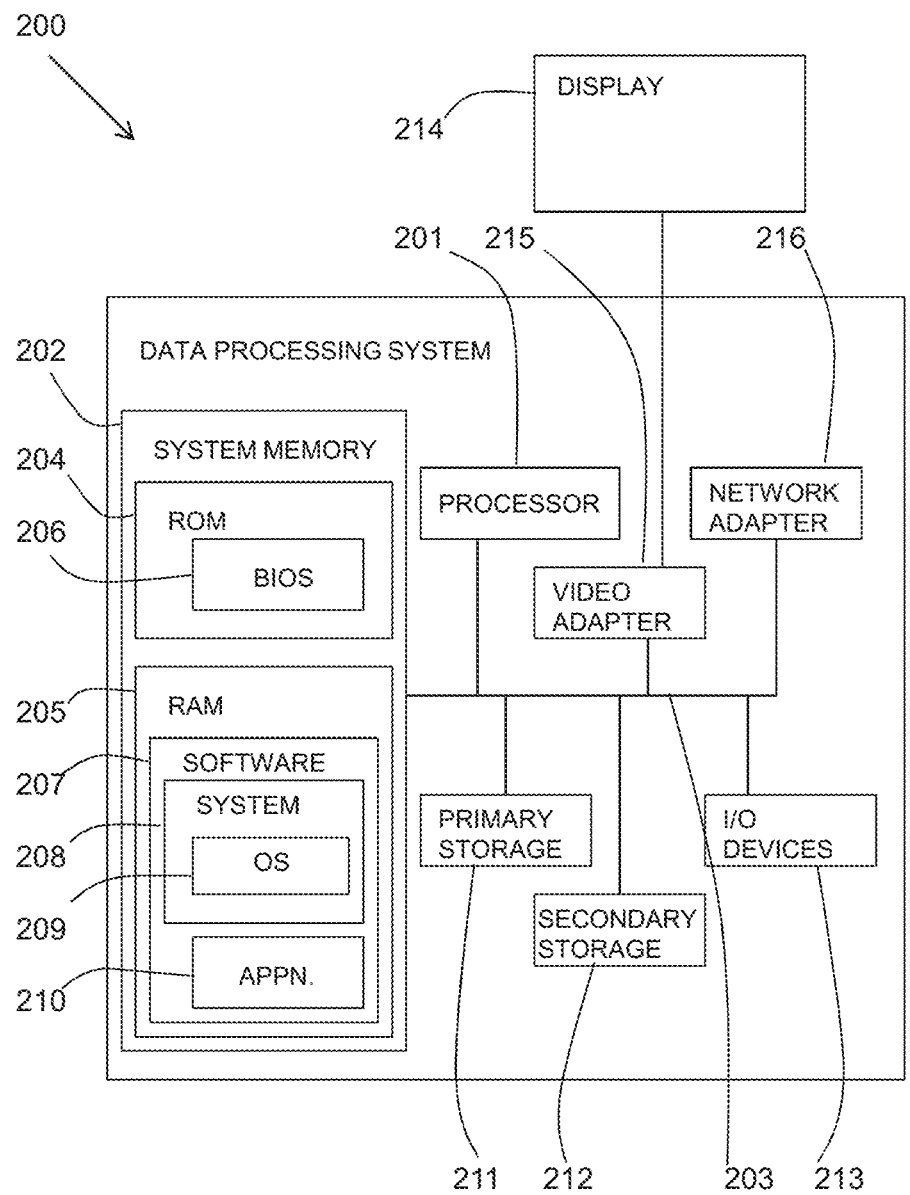
FIG. 2 is a block diagram of an embodiment of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208 comprising operating system (OS) 209. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
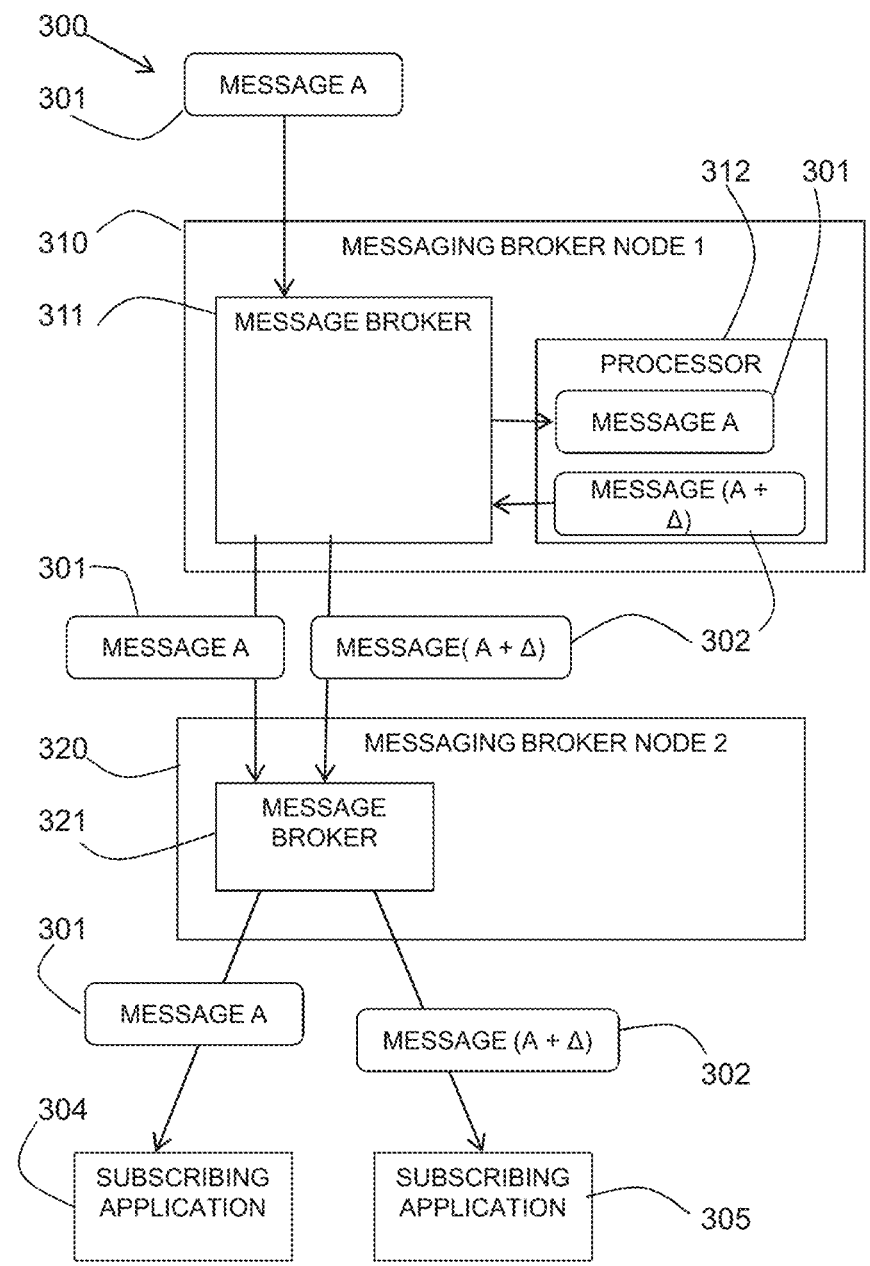
FIG. 3 is a block diagram showing a flow of messages as known in the prior art.

Referring to FIG. 3, a block diagram shows a message broker system 300 with a flow of messages as known in the prior art.

A message A 301 may be received at a first message broker 311 of a first message broker node 310. The first message broker node 310 may include a processor 312 and may carry out in-flight processing of the message A 301. The in-flight processing may result in an amended message 302 formed of message A with changes Δ applied to it. The changes Δ may add to the message, transform the message, or otherwise amend the message.

In the prior art, the original message A 301 and the amended message (A+Δ) 302 may be sent by the first message broker 311 of the first messaging broker node 310 to a second messaging broker node 320. Broker functionality at the first message broker 311 may inspect the data and take account of in-flight message processing and may send both messages if there are subscribing applications 304, 305 requiring both messages.

The first and second subscribing applications 304, 305 may be subscribed to the same topic but require different versions of the message.

The second message broker 321 at the second messaging broker node 320 may forward the first message A 301 to a first subscribing application 304 and the amended message (A+Δ) to a second subscribing application 305.

Figure 4B:
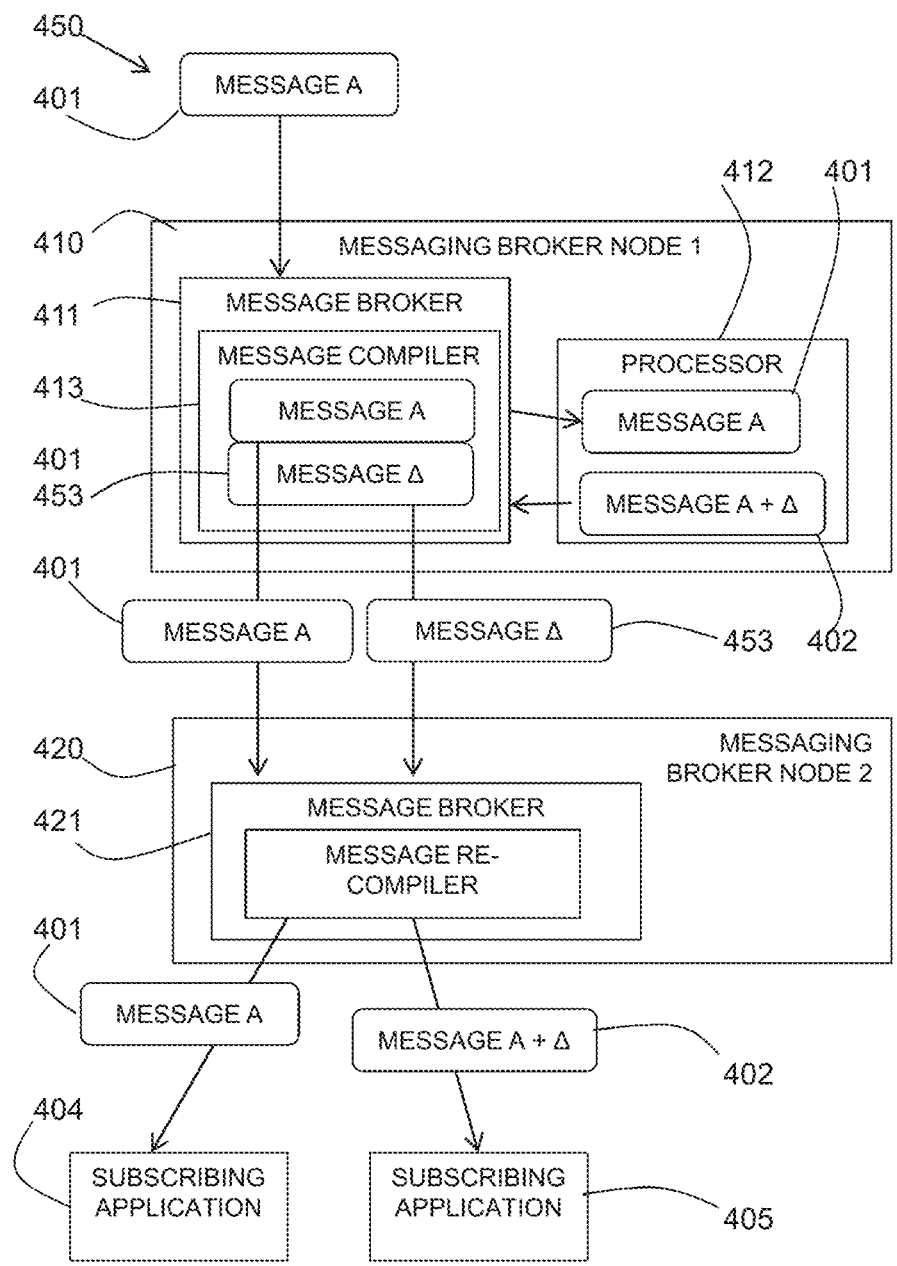

Referring to FIGS. 4A and 4B, two embodiments are shown of the described method and system in which a message broker 411 at a messaging broker node 410 which carries out in-flight processing of a message, publishes one whole message and the changes to the message in the form of delta data of the changes, without sending two versions of the full message.

Referring to FIGS. 4A and 4B, a message A 401 may be received at a first message broker 411 of a first message broker node 410. The first message broker node 410 may include a processor 412 and may carry out in-flight processing of the message A 401. The in-flight processing may result in an amended message (A+Δ) 402 formed of message A with changes Δ applied to it. The changes Δ may add to the message, transform the message, or otherwise amend the message.

The first and second subscribing applications 404, 405 may be subscribed to the same topic but require different versions of the message, the original message A 401 and the processed message (A+Δ) 402.

The first message broker 411 may include a message compiler 413 for compiling the original message 401 and the amended message 402 in one or more transmission messages 403, 401, 453 which include the data in an efficient manner for sending so as not to send the whole original message A 401 and the amended message (A+Δ) 402 to the next message broker 421.

In addition, the second message broker 421 of a second messaging broker node 420 may include a message re-compiler 423 for re-compiling the original message 401 and the amended message (A+Δ) 402 from the one or more transmission messages 403, 401, 453.

In the embodiment shown in FIG. 4A, a single transmission message (A, Δ) 403 is formed by the message compiler 413 of the original message 401 with the differences or deltas Δ between the original message 401 and an amended message (A+Δ) 402 augmented into the original message 401. Alternatively, the single transmission message 403 may be formed of the amended message (A+Δ) 402 with the differences or deltas Δ augmented into it.

The form of augmentation of the differences Δ into the whole message may be specific to the implementation. In some federated broker implementations. Extensible Markup Language (XML) is used to send messages between brokers.

As a simplified example, XML schema may be extended to include delta tags in a single message, as follows.

XML Example

```
<xml>
<messageID>ID</messageID>
<message>message content</message>
<deltas>
<delta>delta 1</delta>
<delta>delta 2</delta>
</deltas>
</xml>
```

In the embodiment of FIG. 4A, the message re-compiler 423 at the second messaging broker node 420 may re-compile the original message 401 and the amended message (A+Δ) 402 from the single transmitted message (A, Δ) 403.

In the embodiment shown in FIG. 4B, two transmission messages 401, 453 may be formed by the message compiler 413 and sent in the form of the original message 401 and a message Δ 453 only including the differences or delta Δ between the original message 401 and an amended message (A+Δ) 402. Alternatively, two transmission messages may be formed and sent in the form of the amended message (A+Δ) 402 and the differences or delta Δ between the amended message (A+Δ) 402 and the original message 401.

The relationship between the two transmitted messages may depend on the implementation. However, using The Fabric example implementation, the XML schema may be extended to include whether a message was the original copy, or a delta and any relating messages may include ID tags for the message to which they relate.

In the embodiment of FIG. 4B, the message re-compiler 423 at the second messaging broker node 420 may re-compile the original message 401 and the amended message (A+Δ) 402 from the original message 401 (or the amended message (A+Δ) 402, whichever is sent) and the message Δ 453 only including the differences Δ.

A second message broker 421 may re-assemble the received original message and may generate a distinct message based on the original copy of the message with the differences applied to produce one or more in-flight processed version of the message.

Figure 5A:
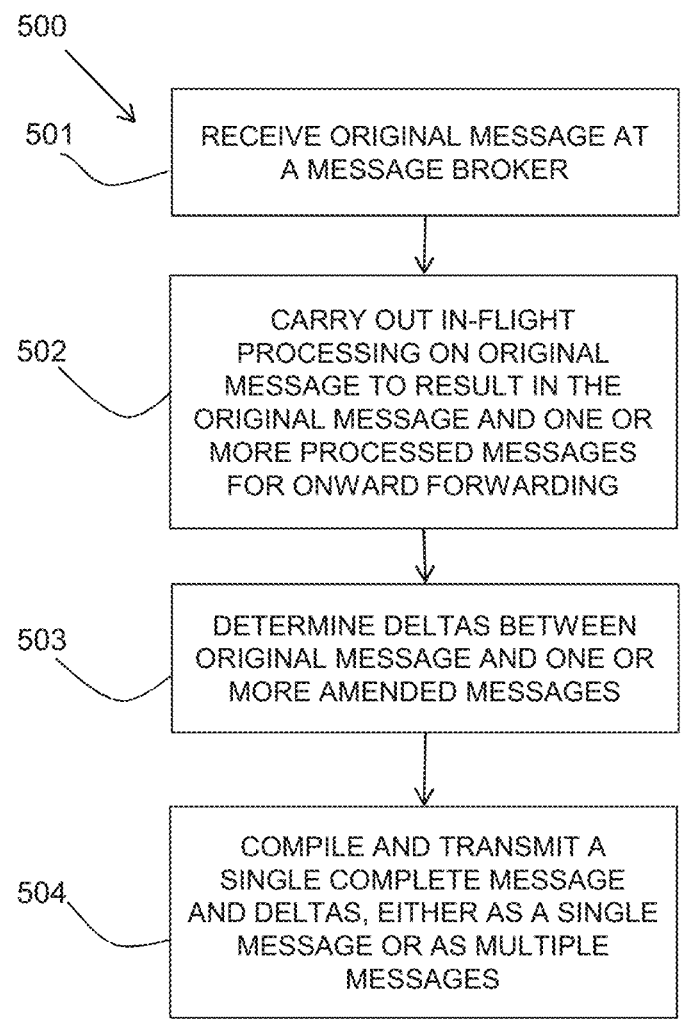
FIGS. 5A and 5B are flow diagrams of example embodiments of aspects of methods in accordance with the present invention.

Referring to FIG. 5A, a flow diagram 500 shows an example of an aspect of the described method as carried out at a message broker which carried out in-flight processing of the message.

An original message may be received 501 at the message broker. In-flight processing may be carried out 502 on the first message to result in the original message plus one or more processed messages for onward publishing.

The differences or deltas between the original message and the one or more processed messages may be determined 503.

One complete message in the form of the original message or a processed message may be compiled and transmitted 504 together with the delta in the messages. This may be published as a single message with the delta augmented into the one complete message, or it may be the one complete message and a message just formed of the delta.

In the case where there is more than one processed message, the one complete message may be the original message and the more than one delta may transmitted either augmented in a single message, the multiple deltas in a separate message, or individual deltas in additional separate messages.

In all scenarios, only one full message is transmitted thereby reducing the network traffic.

Figure 5B:
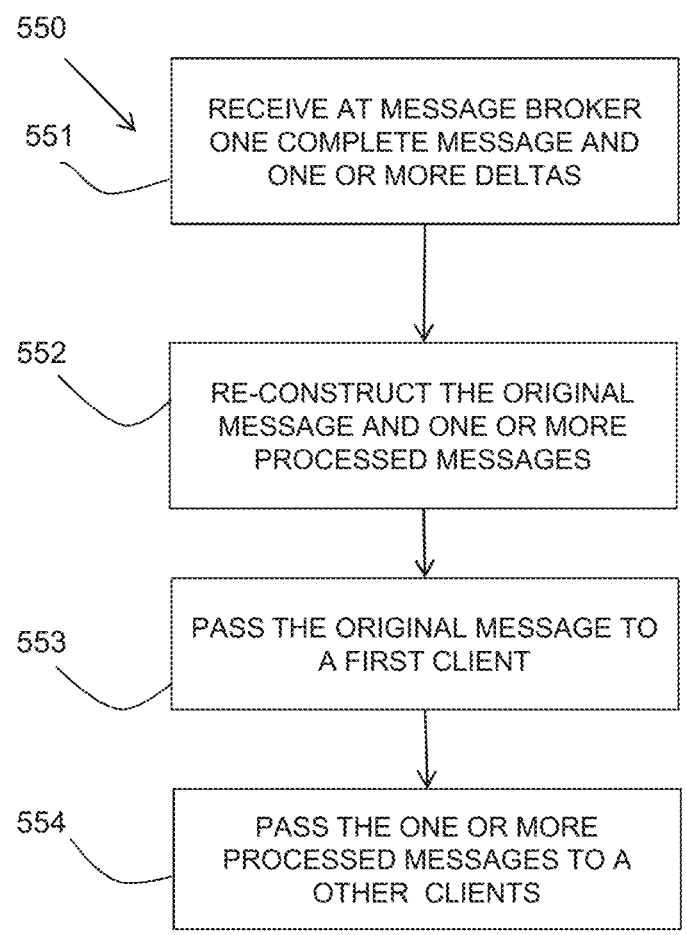

Referring to FIG. 5B, a flow diagram 550 shows an example of an aspect of the described method as carried out at a receiving message broker.

A receiving message broker may receive 551 one complete message and one or more deltas between the complete message and the one or more processed message. For example, the complete message may be in the form of the original message or the processed message.

The original message and the one or more processed message may be re-constructed 552 into two or more whole messages.

The original message may be passed 553 to a first client subscribing to this form of the message. The one or more processed message may be passed 554 to a other clients subscribing to this second form of message.

Example 1

A first example is provided in which a sensor at Node 1 is producing temperature data in Celsius. Node 2 has an in-flight message processing capability that has been configured to pass Celsius data to Client 1 and Fahrenheit data to Client 2. Both Client 1 and Client 2 are subscribed to the topic "Node 1/Temperature". In the prior art, Node 2 would pass two distinct messages for Node 3 to pass out to the two clients it has attached, one with the data in Celsius and one with the data in Fahrenheit.

In the described method and system, the scenario is the same; Client 1 is subscribed to the same topic as Client 2. However, the in-flight message processing applied at Node 2 results in the original message plus the differences arising as a result of the processing being sent to the broker at Node 3. Node 3 can then assemble two distinct messages to be passed out to Client 1 and Client 2, thus saving network traffic between Node 2 and Node 3.

The example scenario is now as follows. Node 1 produces temperature data in Celsius. Node 2 has an in-flight message processing capability that has been configured to pass Celsius data to Client 1 and Fahrenheit data to Client 2. Both Client 1 and Client 2 are subscribed to the topic "Node 1/Temperature". Node 2 passes a single message to Node 3 containing the original message plus the differences arising as a result of the processor. In this example, the difference would be the digits used to describe the value of the temperature, i.e. instead of "20 Celsius", the value is "68 Fahrenheit".

Node 3 assembles two distinct messages, passing the original Celsius to Client 1 and using the differences to assemble a Fahrenheit message for Client 2. The overall amount of network usage has been lowered from the prior art scenario.

Example 2

A further worked example is give to explain how the disclosure provides efficiency savings on the network (i.e. reduced bandwidth requirements). A wider, generic example is used where the payload size is significant.

An example payload of size 1 MB is being sent from Node 1 to Node 3 via Node 2 as before. The content of the payload is not important; it could be sensor readings, text, images, XML, or any other data. Some processing takes place at Node 2 that alters the 1 MB payload slightly.

The described method and system proposes that instead of two 1 MB payloads being sent between Node 2 and Node 3, that the original 1 MB payload plus a much smaller payload containing only the differences between the original payload and the payload resulting from the processing at Node 2 is sent to Node 3.

The network traffic between Node 2 and Node 3 has been significantly reduced by sending only the original payload plus a difference. Current technology would send the original payload plus an entirely new payload differing only slightly from the original.

Node 3 re-assembles two full payloads to send out to the clients. This can be done easily by applying the difference to the original payload to send to one of the clients while sending only the original payload to the other client.

Example 3

A further worked example is given below.

1) Client 1 and Client 2 are subscribed to a topic on Node 1. However, Client 2 is to receive an in-flight processed version of the message where Client 1 receives just the original payload.

2) A Payload of 1024 KB is sent from Node 1 to the clients.

3) In flight message processing adds 16 KB to the message (to be received only by Client 2) at Node 2.

4) A single new payload containing the 1024 KB original and the 16 KB addition is sent between Node 2 and Node 3. For the purposes of description lets say another 1 KB is required for the overhead of describing/wrapping the difference, so 1041 KB is passed between Node 2 and Node 3.

4a) Using prior art technology two payloads would be sent between Node 2 and Node 3, one is 1024 KB (the original) and the other is 1040 KB (processed). Offering a total of 2064 KB transferred between Node 2 and Node 3.

4b) A saving of 1023 KB has been made by the introduction of the describe processing to the system.

5) Node 3 re-assembles two full payloads to transfer to Client 1 and Client 2 respectively.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected t the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

The invention claimed is:

1. A method for data transfer in a federated publish/subscribe system that comprises a processor, a first message broker, and a second message broker, said method comprising:
    said second message broker transmitting, via the processor, a message A to a first subscribing application and a modified message (A+$\Delta$) to a second subscribing application, wherein the modified message (A+$\Delta$) comprises the message A and an addition $\Delta$ to the message A, and wherein the first subscribing application and the second subscribing application are different subscribing applications; and
    prior to said transmitting, said second message broker receiving a direct transmission, from the first message broker via the processor, of two messages consisting of the message A and a change message that includes the addition $\Delta$.

2. The method of claim 1, wherein the method further comprises:
    said second message broker assembling, from the received two messages via the processor, the modified message (A+$\Delta$).

3. The method of claim 2, wherein the message $\Delta$ further comprises an identifier associating the addition $\Delta$ with the message A.

4. The method of claim 2, wherein said second message broker receiving comprises said second message broker receiving the two messages simultaneously from the first message broker.

5. The method of claim 1, wherein the federated publish/subscribe system comprises a first messaging broker node and a second messaging broker node, wherein the first messaging broker node comprises the first message broker, and wherein the second messaging broker node comprises the second message broker and the processor.

6. The method of claim 1, wherein the modified message (A+$\Delta$) consists of the message A and the addition $\Delta$ to the message A.

7. A computer program product, comprising a computer readable hardware storage device having program code stored therein, said program code containing instructions executable by a processor to implement a method for data transfer in a federated publish/subscribe system that comprises the processor, a first message broker, and a second message broker, said method comprising:
    said second message broker transmitting, via the processor, a message A to a first subscribing application and a modified message (A+$\Delta$) to a second subscribing application, wherein the modified message (A+$\Delta$) comprises the message A and an addition $\Delta$ to the message A, and wherein the first subscribing application and the second subscribing application are different subscribing applications; and
    prior to said transmitting, said second message broker receiving a direct transmission, from the first message broker via the processor, of two messages consisting of the message A and a change message that includes the addition $\Delta$.

8. The computer program product of claim 7, wherein the method further comprises:
    said second message broker assembling, from the received two messages via the processor, the modified message (A+$\Delta$).

9. The computer program product of claim 8, wherein the message $\Delta$ further comprises an identifier associating the addition $\Delta$ with the message A.

10. The computer program product of claim 8, wherein said second message broker receiving comprises said second message broker receiving the two messages simultaneously from the first message broker.

11. The computer program product of claim 8, wherein the modified message (A+$\Delta$) consists of the message A and the addition $\Delta$ to the message A.

12. The computer program product of claim 7, wherein the federated publish/subscribe system comprises a first messaging broker node and a second messaging broker node, wherein the first messaging broker node comprises the first message broker, and wherein the second messaging broker node comprises the second message broker and the processor.

13. A federated publish/subscribe system, comprising a processor, a memory coupled to the processor, a computer readable storage device coupled to the processor, a first message broker, and a second message broker, said storage device containing program code executable by the processor via the memory to implement a method for data transfer in the federated publish/subscribe system, said method comprising:
    said second message broker transmitting, via the processor, a message A to a first subscribing application and a modified message (A+$\Delta$) to a second subscribing application, wherein the modified message (A+$\Delta$) comprises the message A and an addition $\Delta$ to the message A, and wherein the first subscribing application and the second subscribing application are different subscribing applications; and
    prior to said transmitting, said second message broker receiving a direct transmission, from the first message broker via the processor, of two messages consisting of the message A and a change message that includes the addition $\Delta$.

14. The federated publish/subscribe system of claim 13, wherein the method further comprises:
    said second message broker assembling, from the received two messages via the processor, the modified message (A+$\Delta$).

15. The federated publish/subscribe system of claim 4, wherein the message $\Delta$ further comprises an identifier associating the addition $\Delta$ with the message A.

16. The federated publish/subscribe system of claim 14, wherein said second message broker receiving comprises said second message broker receiving the two messages simultaneously from the first message broker.

17. The federated publish/subscribe system of claim 13, wherein the federated publish/subscribe system comprises a first messaging broker node and a second messaging broker node, wherein the first messaging broker node comprises the first message broker, and wherein the second messaging broker node comprises the second message broker and the processor.

18. The federated publish/subscribe system of claim 13, wherein the modified message (A+Δ) consists of the message A and the addition Δ to the message A.

* * * * *